United States Patent
Kim et al.

(10) Patent No.: US 10,893,151 B1
(45) Date of Patent: Jan. 12, 2021

(54) DATA GAP BRIDGING METHODS AND SYSTEMS

(71) Applicant: HEWLETT PACKARD ENTERPRISE DEVELOPMENT LP, Houston, TX (US)

(72) Inventors: Kyu-Han Kim, Palo Alto, CA (US); Yuanjie Li, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/447,376

(22) Filed: Jun. 20, 2019

(51) Int. Cl.
*H04M 15/00* (2006.01)
*H04L 12/14* (2006.01)

(52) U.S. Cl.
CPC ........ *H04M 15/64* (2013.01); *H04L 12/1407* (2013.01); *H04M 15/41* (2013.01); *H04M 15/8083* (2013.01)

(58) Field of Classification Search
CPC ...... H04M 15/00; H04M 15/73; H04M 15/41; H04M 15/43; H04M 15/44; H04M 15/64; H04M 2215/7072; H04M 15/58; H04M 15/60; H04M 15/70; H04M 15/8083; H04L 12/14; H04L 12/1403; H04L 12/1407; H04W 4/24
See application file for complete search history.

(56) References Cited

U.S. PATENT DOCUMENTS

| 7,526,547 | B2 | 4/2009 | Rodrigo | |
|---|---|---|---|---|
| 2004/0073500 | A1* | 4/2004 | Owen, Jr. | H04M 15/51 705/30 |
| 2004/0133488 | A1* | 7/2004 | Daidone | G06Q 20/102 705/34 |
| 2012/0208497 | A1* | 8/2012 | Moeller | H04L 12/1428 455/408 |
| 2016/0142554 | A1 | 5/2016 | Anand | |
| 2017/0118616 | A1 | 4/2017 | Kothari et al. | |
| 2018/0183939 | A1* | 6/2018 | Wijetunge | H04M 15/58 |

OTHER PUBLICATIONS

STL, "Mobile Data Charging Platform (2G, 3G, LTE)," retrieved online May 22, 2019, https://www.sterlitetech.com/mobile-data-charging-platform.html.

(Continued)

*Primary Examiner* — Quoc Thai N Vu
(74) *Attorney, Agent, or Firm* — Nolte Intellectual Property Law Group

(57) ABSTRACT

A computer implemented method for decreasing latency in a billing cycle, the method comprising receiving a first charging data report (CDR) including a sent data volume from a vendor and comparing the first CDR to an operator received data volume and when the first CDR does not match the operator received data volume, rejecting the first charging report. The method further comprising providing a second CDR having the operator received data volume to the vendor, receiving a charging data acceptance including a negotiated data volume from the vendor, constructing a publicly verifiable proof of charging based on the charging data acceptance, and sending the publicly verifiable proof of charging to the vendor.

14 Claims, 12 Drawing Sheets

(56) References Cited

OTHER PUBLICATIONS

ETSI, "ETSI TS 124 008 V13.7.0," Technical Specification, Oct. 2016, https://www.etsi.org/deliver/etsi_ts/24000_124099/124008/13.07.00_60/ts_124008v130700p.pdf.
3GPP, "TS 23.203: Policy and Charging Control Architecture", V12.8.0, Release 12, Mar. 2015, pp. 1-222.
3GPP, "TS 23.401: General Packet Radio Service enhancements for Evolved Universal Terrestrial Radio Access Network (E-UTRAN) access", V14.10.0, Release 14, Dec. 2018, pp. 1-394.
3GPP, "TS 23.501: System Architecture for the 5G System",V15.4.0 , Release 15, Dec. 2018, pp. 1-236.
3GPP, "TS 24.008: Core Network Protocols; Stage 3", V4.17.0, Release 4, Sep. 2007, pp. 1-460.
3GPP, "TS 32.291: Charging Management; 5G system, Charging Service; Stage 3", V1.0.0, Release 15, Sep. 2018, pp. 1-59.
3GPP, "TS 36.331: E-UTRA; Radio Resource Control (RRC)", V13.11.0, Release 13, Sep. 2018, pp. 1-645.
3GPP, "TS 38.331: 5G NR; Radio Resource Control (RRC)", V15.3.0, Release 15, Sep. 2018, pp. 1-445.
Aladerson, "Excessive Data Usage", available online at <https://forums.att.com/conversations/wireless-account/excessive-data-usage/5defe880bad5f2f606868f58>, AT&T Community Forums, Jun. 11, 2017, 5 pages.
C. Scott Brown, "Lawsuit alleges Project Fi charges customers for Wi-Fi use", available online at <https://www.androidauthority.com/lawsuit-alleges-project-fi-charges-customers-wifi-use-835973/>, Android Authority, Feb. 7, 2018, 2 pages.
ETSI, "GS MEC 003: Mobile Edge Computing (MEC); Framework and Reference Architecture", GS MEC 003 V1.1.1, Mar. 2016, 18 pages.
ETSI, "Multi-access Edge Computing (MEC); Phase 2: Use Cases and Requirements", GS MEC 002 V2.1.1, Oct. 2018, pp. 1-66.
Gilbert et al., "Brewer's Conjecture and the Feasibility of Consistent, Available, Partition-Tolerant Web Services", 2002, pp. 51-59.
MyAT&T, "Shop & support", available online at <https://web.archive.org/web/20181231091939/https://www.att.com/my/#/login>, Dec. 31, 2018, 1 page.
Robert Gibbons, "Game Theory for Applied Economists", Princeton University Press , 1992, 142 pages.
T-Mobile, "T-Mobile bill app", available online at <https://www.t-mobile.com/apps/download-t-mobile-app>, 2019, 5 pages.
W. M. Cunningham, "Overbilling, kinda like Apple throttling", available online at <https://support.google.com/fi/forum/AAAARQbf-usnhuNE6YqbWQ/?hl=en&gpf=%23!msg%2Fproject-fi%2FnhuNE6YqbWQ%2FYcMgNz9UDAAJ&msgid=YcMgNz9UDAAJ?, Jan. 8, 2018, 3 pages.
Wikipedia, "Network Time Protocol", available online at <https://en.wikipedia.org/w/index.php?title=Network_Time_Protocol&oldid=875995413>, Dec. 30, 2018, 13 pages.

\* cited by examiner

| | |
|---|---|
| $c \sim [0,1]$ | Pre-defined charging weight for the lost data (in the data plan) |
| $T$ | Charging cycle in the data plan: $T = T_{start}, T_{end}$ |
| $X_e, X_o$ | The actual data vendor-sent/operator-received |
| $\tilde{X}_e, \tilde{X}_o$ | The data use claimed by the vendor/operator |
| $\hat{X}$ | The actual usage that would be charged absent data loss and/or undercharging and/or overcharging |
| $X$ | The negotiated data use |
| $K_e^+, K_e^-$ | Vendor public/private key pair |
| $K_o^+, K_o^-$ | Operator public/private key pair |
| $n_e, n_o$ | Nonces for the vendor/operator |
| $s_e, s_o$ | Sequent numbers for the vendor/operator |

FIG. 3A

```
1:      X_L ← 0, X_U ← infinity
2:      while True do
3:                      (Exchange CDRs. The order will not affect the results)
4:          Vendor ←→ Operator: X_e, X_o — {Accept, Reject}
5:                      (Exchange decisions. The order will not affect the results)
6:          Vendor ←→ Operator: R_e, R_o — {Accept, Reject};
7:          if R_e == Accept and R_o == Accept then
8:                  X_o + c x (X_e − X_o)
              X ←
                  X_e + c x (X_o − X_e)    otherwise
9:          Vendor & Operator sign and store PoC with X
10:             return;           (Negotiation completed)
11:         else                  (Otherwise, reclaim CDRs with new bounds)
12:             X_L ← min {X_e, X_o}, X_U ← max {X_e, X_o}
13:         end if
14:     end while
```

FIG. 3B

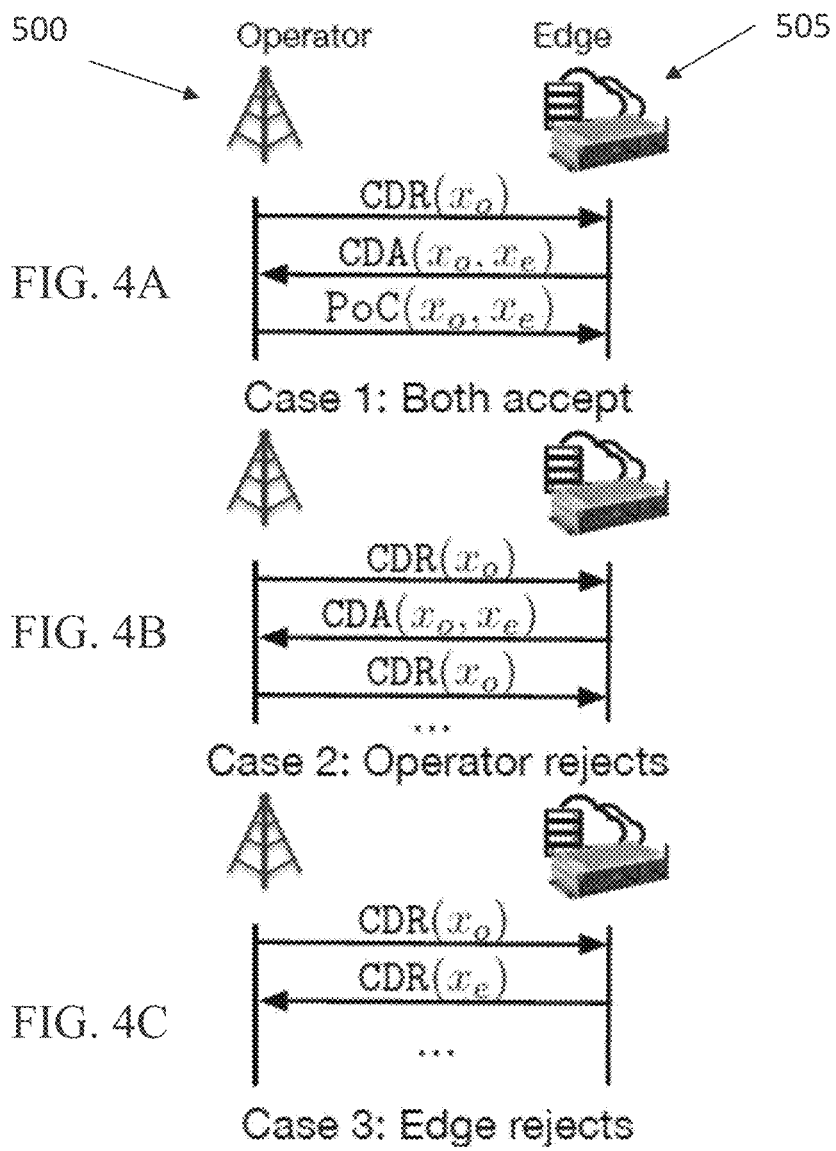

Require:    PoC, T, c, $K_e^+$, $K_o^+$
1:           (T', c', X, $X_e$, $X_o$, $n'_e$, $n'_o$, $s_e$, $s_o$) ← Decrypt $K_e^+$, $K_o^+$ (Poc)
2:           if T' not equal T or c' not equal c then
3:              return false;                     (Inconsistent data plan)
4:           end if
5:           if $n'_e \neq$ PoC. $N_e$ or $n'_o \neq$ PoC.$n_o$ or $s_e \neq s_o$ then
6:              return false;                     (Resilient to replay attacks.)
7:           end if
8:

$$X' \leftarrow \begin{cases} X_o + c \times (X_e - X_o) \\ X_e + c \times (X_o - X_e) & \text{otherwise} \end{cases}$$

9:           Return (X' == X);

FIG. 5

DATA GAP BRIDGING METHODS AND SYSTEMS

BACKGROUND

Cellular solutions, such as 4G, 4G LTE, 5G, beyond-5G, and other services provide low-latency experiences for end users, as well as vendors that provide services using such cellular solutions. The "intelligent wireless edge", such as 4G and 5G networks, provides low-latency cellular services to various types of end users, such as vendors and clients of the vendors. These wireless applications may provide low-latency service in both indoor and outdoor settings, as well as both static and mobile settings. For example, such cellular networks provide speeds that may allow real-time video analytics, self-driving vehicles, virtual reality, online gaming, and the like. Use of such cellular networks result in expenses that are paid by the vendors in order to provide applications that are accessible over the network.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 3A is a is a table of notations that are used in FIG. 4, according to one or more examples of the disclosure.

FIG. 3B is a process for cancelling data loss and selfish charging practices, according to one or more examples of the disclosure.

FIG. 4A is a representation of a case that may occur during a negotiation between a vendor and an operator, according to one or more examples of the disclosure.

FIG. 4B is a representation of a case that may occur during a negotiation between a vendor and an operator, according to one or more examples of the disclosure.

FIG. 4C is a representation of a case that may occur during a negotiation between a vendor and an operator, according to one or more examples of the disclosure.

FIG. 5 is pseudocode for a process for publicly verifying a negotiation, according to one or more examples of the disclosure.

DETAILED DESCRIPTION

Figure 1:
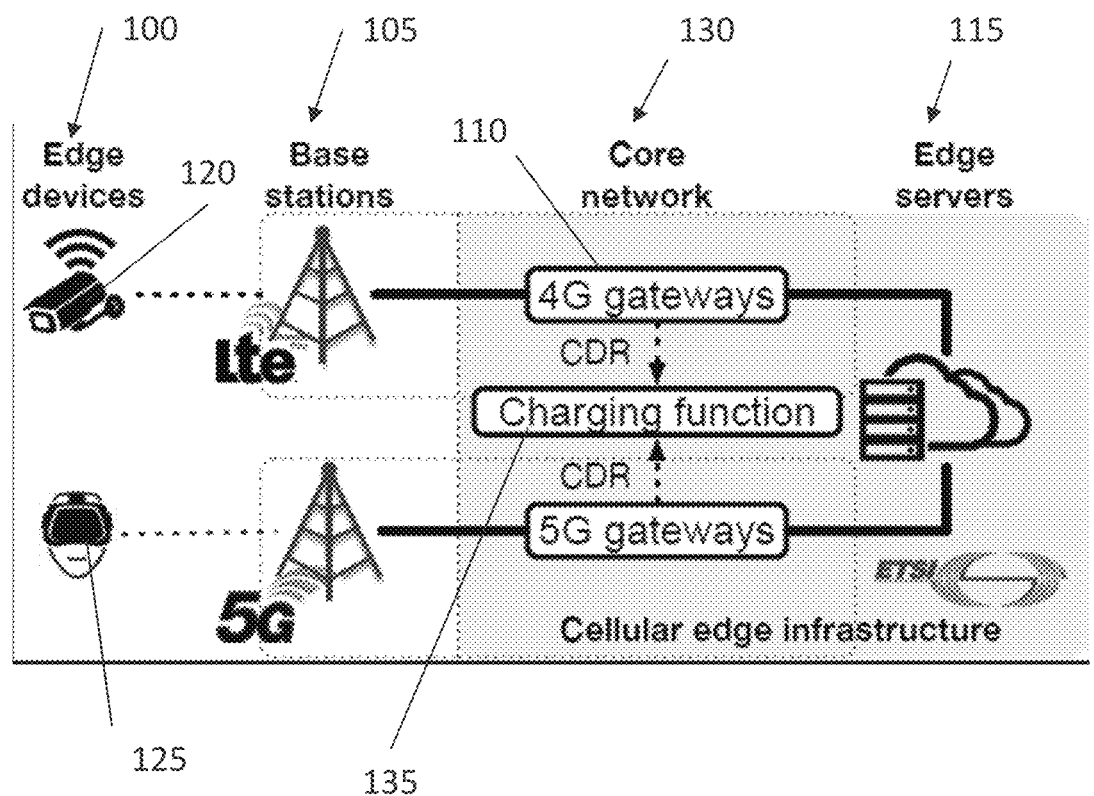
FIG. 1 is a representation of an intelligent edge network, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

End users and/or vendors pay for cellular services that are provided by operators, such as cellular operators, and pay such operators for the amount of data that is used. While providing services, discrepancies may arise that result in the amount of data billed by the operator or the amount of data use claimed by the vendor. As such, a data charging gap may occur that affects the services provided by the operator and used by the vendor.

While the payment scheme is relatively straightforward, issues arise when vendors and operators utilize different data volume consumption models. Accordingly, a "data charging gap" may occur. The data charging gap refers to the difference between the volume of data charged by the operator and the volume of data the vendor sends/receives. For example, a vendor may track an amount of data sent to a network of a cellular operator. Similarly, the cellular operator may track the amount of data that is sent by the vendor over the network. However, the amount of data sent by the vendor and received by the cellular operator may not be the same due to data loss and/or other issues that occur during transmission of the data. In such a situation, a vendor may record having sent less data than received by the cellular operator and/or the cellular operator may record having received more data than was actually sent by the vendor. Such situations may occur as a result of data loss over the network, i.e., from lost packets, intermittent transmission issues, etc., as well as charging discrepancies between the vendor and cellular operator. The increase of networking speeds due to the implementation of 4G and 5G networks may result in increased data volume/charging discrepancies.

For example, the adoption of real-time protocols may result in a data charging gap that contributes 8.28 MB/hour, which may result in an 8.3 percent differential in web-cam streaming via a real time streaming protocol ("RTSP"); 59.04 MB/hour, which may result in a 6.7 percent differential in webcam streaming via user datagram protocol ("UDP"); and 80.64 MB/hour, which may result in an 8.0 percent differential in virtual reality offloading. Additionally, when intermittent connectivity issues or network congestion occurs, the data charging gap may increase even further. For example, the data charging gap may escalate to 98.16 MB/hour for webcam streaming via RTSP, 252.0 MB/hour for webcam streaming via UDP, and 982.8 MB/hour for virtual reality offloading. The data charging gap may thereby result in over/under billing, as well as result in strained relations between vendors and operators.

The data charging gap may result from any number of issues, including for example, network data loss and inconsistent charging schemes. Data loss refers to network traffic that is lost during operator delivery, i.e., charged but undelivered data volume. Data loss may occur due to a number of issues, such as intermittent connectivity, i.e., when a device temporarily loses wireless coverage that results in data being lost over the air. Data may also be lost due to link-layer mobility, e.g. when a moving device switches base stations or radio technologies. Data loss may further occur as a result of Internet protocol ("IP") layer congestion, in which packets may be dropped after being charged by a gateway, or during transport-layer retransmission, in which data may be over charged due to spurious retransmission. While data loss has occurred in prior, slower cellular network applications, low-latency applications, such as those used in the intelligent edge result in greater volumes of data loss.

The data charging gap may also be exemplified as a result of the charging practices of the vendors and operators. Vendors have an economic incentive to underclaim the amount of data used, while operators have an economic incentive to overclaim the amount of data provided. The underclaiming and overclaiming by the vendors and operators, respectively, is referred to as selfish claiming.

While data loss and selfish claiming may occur independently, in certain circumstances, both data loss and selfish claiming may occur simultaneously. For example, data loss may occur, and during billing, the vendor may underclaim, while the operator may overclaim, the amount of used data. Thus, the data charging gap may be exemplified. To reconcile the data charging gap, the vendor and operator may negotiate the charges to account for both data loss and their individual billing practices. To account for the data loss, thereby recapturing lost data and modifying the billing accordingly, synchronization of the data records for both the vendor and operator may occur.

Such synchronization results in blocking data transfer on the network, thereby resulting in decreased network performance. In low-latency intelligent edge applications, the decreased network performance may render the network unsuitable for the uses of the vendors. Additionally, synchronization may not account for selfish claims of either the vendor or operator. Thus, even if synchronization results in some lost data recovery, the billing claims may still not be reconciled.

The present disclosure provides systems and methods to bridge the data charging gap by reconciling the data loss and selfish charging claims together. Such systems and methods may thereby account for data loss and selfish charging claims, result in less data transfer delay, and allow for third party verification.

Such methods may include an operator receiving a first charging report that includes a "sent data volume" from a vendor. The operator may also provide a second charging report that includes a "received data volume" to the vendor. The operator and/or vendor may then compare the respective charging reports and determine whether the charging reports are acceptable. For example, if the amount of data the vendor claims to have sent and the amount of data the operator claims to have received matches, then the charging reports may be accepted by both parties. One or more of the parties may then provide the other party a charging data acceptance. One or more of the parties may then construct a proof of charging based on the charging data acceptance that indicates the agreed upon volume of data that the vendor will pay the operator. The proof of charging may then be exchanged between the parties, thereby providing an agreed upon record. The proof of charging may also be publicly verifiable, so it may later be verified by an independent third party.

In certain circumstances, when the parties exchange charging records, the charging records may not agree due to differences in charging schemes. Responsive to the discrepancy, a party may provide a revised charging report that includes a revised data volume to the other party. If the party agrees with the revised charging report, they may send a charging data acceptance including the negotiated data volume, at which point a proof of charging may be constructed, as described above. A record of the negotiation may be recorded in the proof of charging, thereby enabling third party verification.

The process above may occur at any number of frequencies: e.g., once a week, month, per billing cycle etc., thereby resulting in less strain on network speeds. Additionally, because the parties negotiate the amount of data volume paid by the vendor to the operator, both data loss issues and selfish claims are resolved. Specific example implementations are discussed below.

Turning to FIG. 1, a representation of an intelligent edge network, according to one or more examples of the disclosure is shown. FIG. 1 illustrates two different edge devices 100, in this example a wireless camera 120 and a virtual reality device 125, which receive data from operator base stations 105. The base stations 105 are operatively connected to gateways 110, which provide applications and/or data from edge servers 115. In operation, data is provided from edge servers 115 through gateways 110, which is then transmitted to base stations 105 that are wirelessly connected to edge devices 100.

As illustrated, edge devices 100 may include various types of wireless devices such as, for example, wireless cameras 120 and virtual reality device 125. Edge devices 100 may further include devices deployed in vehicles or various types of internet-of-things ("IoT") devices. Edge servers 115 may offload data from edge devices 100 to run analytics, aggregate results, and otherwise perform computations for edge devices 100. Edge server 115 may be deployed in the cellular infrastructure and may be owned by the operator, the vendor, or jointly owned by both.

As discussed above, the operators of the cellular network charge the vendors for data usage. The charging occurs in the core network 130 and involves gateways 110 and charging function 135. In operation, gateways 110 forward edge traffic and generate charging data records ("CDR"). Gateways 110 may include hardware used in telecommunications and/or telecommunication networks that allow data to flow between networks. Gateway 110 may encode an edge device 100 identity, a waterway IP address, a charging policy profile, and the data usage. Gateway 110 may then send the CDR to a charging function 135. Charging function 135 may then convert the CDR to a bill, which may include certain policy actions. Policy actions may account for network speed limits, issues with service, and the like, and may be based on negotiated data plans, data usage, quality of service, service priority, etc.

A data charging gap may occur when the operator claims to have received more data from the vendor than the vendor claims to have sent. Additionally, data loss may occur when edge devices 100 move out of range of base stations 105, change base stations 105, experience intermittent data loss, etc. Reconciliation of the data charging gap is discussed in detail with respect to FIG. 2, below.

Figure 2:
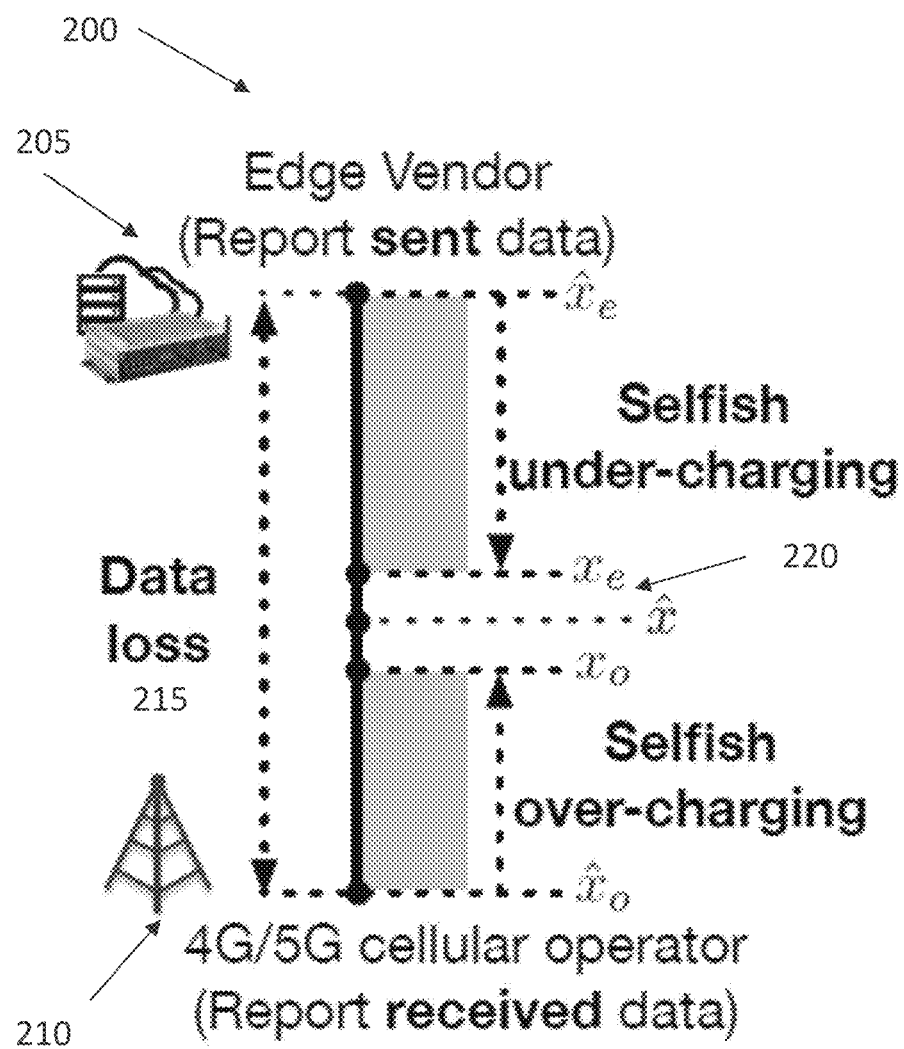
FIG. 2 is a representation of a data charging gap between an edge vendor and a cellular operator, according to one or more examples of the disclosure.

Turning to FIG. 2, a representation of a data charging gap between an edge vendor and a cellular operator according to one or more examples of the disclosure is shown. In this example, a vendor 205 may be an edge vendor, which is using a wireless network provided by an operator 210, which may be a cellular operator. Vendor 205 may use the wireless network provided by operator 210 to provide specific services, such as those discussed above, to end users in the form of applications, and the like. As explained above, during operation, data loss 215 may occur as a result of various vendor 205 and/or operator 210 induced issues. Data loss may occur as a result of users of vendors 205 applications moving in an out a service area of operator 210 coverage area, intermittent transmission issues, vendor 210 downtime, etc. The data loss 215 may include tens, hundreds, thousands, or millions of megabytes of data in a billing cycle. The volume of data sent by the edge vendor 205 is denoted in FIG. 1 as $\hat{X}_e$. The volume of data received by the operator is denoted as $\hat{X}_o$. The final data charging volume $\hat{X}$, represents the volume of data that will be charged when vendor 205 and operator 210 transmit the actual volume of data sent and received, respectively.

During billing, edge vendor 205 sends a report that includes the volume of data edge vendor 205 claims to have sent to operator 210. The volume of data claimed by edge vendor 205 is denoted as $X_e$. Similarly, operator 210 sends vendor 205 a report that includes the volume of data claims to have been received by operator 210. The volume of data claimed by the operator is denoted as $X_o$. In this example, edge vendor 205 is under claiming the amount of data the was sent, which results in selfish undercharging. Similarly, operator 210 is over claiming the amount of data that was received, which results in selfish overcharging. As a result of the undercharging and overcharging, a data charging gap 220 occurs.

To account for data charging gap 220 and to reconcile the charges, the data loss 215 and selfish undercharging and overcharging may be cancelled out. The cancellation of data loss 215 and the charging practices of vendor 205 and operator 210 are explained below with respect to FIGS. 3 and 4.

Turning to FIGS. 3A and 3B together, FIG. 3A is a table of notations that are used in FIG. 3B, which illustrates a process for cancelling data loss and selfish charging practices, according to one or more examples of the disclosure. The method of reconciling a data charging gap may be performed by the vendor and/or the operator. Before discussing the process in FIG. 4, several variables as used herein are defined. The actual data sent by the vendor, i.e., the sent data volume determined by the vendor, is $\hat{X}_e$, while the actual data received by the operator, i.e., the received data volume determined by the vendor is $\hat{X}_o$. The data claimed to have been sent by the vendor is $X_e$, while the data claimed to have been received by the operator is $\hat{X}_o$. The actual usage that would be charged absent data loss and/or undercharging and/or overcharging is $\hat{X}$, while the negotiated usage is X. For every data cycle, $\hat{X}_e$ is less than or equal to $\hat{X}_o$ ($\hat{X}e \leq \hat{X}o$) because an operator cannot receive more data than is sent by a vendor. Additionally, data loss is ($\hat{X}_e - \hat{X}_o$), which occurs when the vendor sends data that the operator does not receive. Additionally, c is a pre-defined charging weight for the lost data, as defined in the data plan. For example, a pre-defined charging weight for the lost data of 0 means that the received data and not the send data will be charged, while a charging weight of 1 means that the send data and not the received data, will be charged. In view of the above, the following equation may be realized:

$$\hat{X} = \hat{X}o + c \times (\hat{X}e - \hat{X}o), 0 \leq c \leq 1 \text{ and } \hat{X}o \leq \hat{X}e$$

This equation indicates that the final data charging volume $\hat{X}$ may be equal to the actual received data volume by the operator $\hat{X}_o$ added to the data loss ($\hat{X}_e - \hat{X}_o$) as multiplied by the charging weight. In this implementation, the charging weight c is 0, 1, or some number therebetween. Additionally, the actual received data volume by the operator $\hat{X}_o$ may be less than or equal to the actual sent data volume by the vendor $\hat{X}_e$ for the reasons explained above. The actual received data volume by the operator $\hat{X}_o$ may not equal the actual sent data volume of the vendor $\hat{X}_e$. Thus, if the vendor reports an actual sent data volume $\hat{X}_e$ and the operator reports an actual received data volume $\hat{X}_o$, negotiation of a charged data volume may equal the final data charging volume $\hat{X}$.

Referring specifically to FIG. 3B, during reconciliation of charging periods, the vendor and the operator exchange charging records. In certain implementations, either the vendor or the operator initiates an exchange by providing either a sent data volume on the part of the vendor or a received data volume on the part of the operator, which occurs at line 4. One or more of the vendor and the operator decide whether to accept the claim or deny the claim, which occurs at line 6. If both the vendor and the operator decide to accept, the negotiated charging volume X is decided upon as illustrated at lines 7-9. Lines 7-9 describe performing the charging weight calculation, as discussed above and if (Xo≤Xe), the vendor and the operator sign and store the agreed upon volume as a proof of charging ("PoC"), which is based on both parties returning the same volume of data to be charged X.

However, if either the vendor or the operator returns a different volume of data, to be charged, a reclaim occurs, at line 12. The reclaim is under a constraint that, both the vendor and operator's next round's charging claim should be no less than the previous round's claims' minimal value, and no more than the previous round's claims' maximum value. After the negotiation, when both the vendor and operator return the same charging volume, the volume of data to be charged X is recorded, as explained above and illustrated at lines 7-9. As described above, the vendor and operator may then sign and store the agreed upon volume as a PoC. To further explain the negotiation between the vendor and the operator, specific scenarios will be discussed in detail with respect to FIG. 5.

As discussed above, in certain instances, one or more of the vendor and/or the operator may not report the actual sent or received data volumes. Accordingly, there may be data loss ($\hat{X}_e - \hat{X}_o$), as well as an operator over claiming usage (o≥$\hat{X}$o), and/or a vendor under claiming usage ($\tilde{X}$e≤Xe). To overcome the situation when there is data loss and/or under or over-claiming, implementations of the present disclosure provides bounded charging, where $\hat{X}$o<Xe, Xo≤$\hat{X}$e. In such an implementation, the vendor should not under claim, while the operator should not over claim.

When the process in FIG. 3B stops, the charging report is provably bound, as:

$$(\hat{X}o \leq \hat{X}e \leq \hat{X}e \text{ and } \hat{X}o \leq Xo \leq \hat{X}e)$$

If the vendor and operator are honestly claiming data usage the vendor will report $\hat{X}$e=Xe and the operator will report $\hat{X}$o=Xo. However, as previously explained, in certain situations vendors and operators may not correctly report data volume usage. The vendor and operator may not report data usage correctly. However, if the vendor and operator want to resolve the negotiation as quickly as possible, a negotiation will result in a solution that results in reconciliation of data loss without overclaiming and/or underclaiming. The vendor is incentivized to resolve the claim so that they have access to the services, while the operator is incentivized to resolve the claim so that they get paid. Such incentivization further results in decreased latency periods for the network.

First, the negotiated charging X (line 8 in the process in FIG. 3B) is positively monotonic with $\hat{X}_e$ and $\hat{X}_o$ ($0 \leq c \leq 1$). As such, a rationally motivated vendor will not over-claim its charging, and the rational operator will not under-claim their charging. Thereby resulting in $\hat{X} \leq Xe$ and $Xo \geq \hat{X}o$. If $Xe < \hat{X}o$, the result is $Xe < \hat{X}o \leq \hat{X}o$ because a rational operator will not under-claim. The operator thus detects $Xe < \hat{X}o$ based on its actual received data volume $\hat{X}_o$. Now, in the process, the operator chooses to accept or reject the conflict (line 6). The first option is to reject when $Xe < \hat{X}o$, which reinitiates a reclaim cycle (line 16). The second option is the accept when $Xe < \hat{X}o$ and if the vendor accepts, the process will stop with $Xe < \hat{X}o$ and X. However, if the vendor rejects, the rejection results in a reclaim cycle (line 16). Thus, to maximize charging, a rational operator would reject when $Xe < \hat{X}o$, thereby allowing the process to stop with $\hat{X}o \leq Xe \leq \hat{X}e$, or when $\hat{X}o \leq Xo \leq Re$. Thereby resulting in $\hat{X}o \leq X \leq \hat{X}e$, as provided in line 8 of the process when taking into consideration ($0 \leq c \leq 1$), and discussed previously. Accordingly, when the vendor and operator report their respective claims either honestly, or rationally negotiated, the process results in a bound solution that is relatively quickly achievable and resolves both data loss and under and overclaiming issues.

The above described process may thereby result in a low latency negotiation because no data transfer is blocked during a charging cycle. Instead, the process runs at the end of the charging cycle. Additionally, the process does not use extra processing or storage overhead for data packets, thereby avoiding processing delays. Furthermore, at the end of the charging cycle, $X=\hat{X}$ in a single round of negotiating so long as the vendor and operator are reporting accurately or rationally.

Turning to FIGS. 4A, 4B, and 4C, representations of three cases that may occur during a negotiation between a vendor and an operator, according to one or more examples of the disclosure is shown. In FIG. 4A, Case 1, both an operator 500 and a vendor 505 accept the data volume. Initially, operator 500 sends a CDR having an operator received data volume ($X_o$). Vendor 505 reviews the CDR including received data volume ($X_o$) and compares it to a sent data volume ($X_e$). Vendor 505 determines that either the received data volume ($X_o$) provided by operator 500 matches the sent data volume ($X_e$), or that the received data volume ($X_o$) is acceptable. Vendor 505 then sends a charging data acceptance ("CDA") to operator 500, indicating that the operator 500 supplied data volume ($X_o$) is acceptable ($X_o$, $X_e$). Operator 500 then sends vendor 505 a PoC that includes both data volumes ($X_o$, $X_e$).

In FIG. 4B, Case 2, operator 500 rejects the sent data volume ($X_e$) provided by vendor 505. In this example, operator 500 sends a CDR to vendor 505 that includes a received data volume ($X_o$). Vendor 505 reviews the CDR and accepts the data volume provided by operator 500. Vendor 505 then sends a CDA to operator 500 that includes both data volumes ($X_o$, $X_e$). Upon receipt, operator 500 reviews the CDA and determines that the vendor 505 sent data volume ($X_e$) is not acceptable. Thus, rather than create and send a PoC, operator 500 sends a revised CDR that includes a received data volume ($X_o$), which may be different than the originally received data volume ($X_o$). This negotiation may continue until both parties agree on the received data volume ($X_o$) and the sent data volume ($X_e$), at which point one party may create a CDA and another party may create a PoC based on the CDA, for execution by both parties.

In FIG. 4C, Case 3, the vendor 505, in this instance an edge vendor, rejects the received data volume ($X_o$) provided by operator 500. In this example, operator 500 sends a CDR to vendor 505 that includes the received data volume ($X_o$). Vendor 505 reviews the CDR and determines that the received data volume ($X_o$) does not match a sent data volume ($X_e$). Thus, vendor 505 rejects the CDR and generates a new CDR with a sent data volume ($X_e$). Vendor sends the new, revised, CDR to operator 500. As described above, this negotiation may continue until both parties agree on the received data volume ($X_o$) and the sent data volume ($X_e$), at which point one party may create a CDA and another party may create a PoC based on the CDA, for execution by both parties.

The negotiation process may include relatively few transactions, such as the negotiation described in Case 1, where the parties agree on the data volume. In other examples, the negotiation may include several rounds of CDRs and/or CDAs until an agreement is reached. Regardless of the number of rounds in the negotiation, because the negotiation occurs at the end of the billing cycle and does not include synchronizing data records, the latency caused by the negotiation may be relatively minor, thereby not significantly affecting network performance.

After negotiation, in certain implementations, the PoCs that are created may be subject to public verification by, for example, an independent third party. Examples of independent third parties may include governmental organizations (the Federal Communications Commission, courts, and the like) as well as mobile virtual network operators ("MVNO"). Both governmental organization and MVNOs may access charging records for vendors and operators, as the governmental organizations conduct inspections, and MVNOs rent infrastructure from operators.

Turning to FIG. 5, pseudocode for a process for publicly verifying a negotiation, according to one or more examples of the disclosure is shown. Variables in FIG. 5 are defined in FIG. 3A, above. During verification, the third-party verifier may be provided or otherwise access a PoC. Along with the PoC, the verifier is provided a charging cycle in the data plan (T), which defines the start of the charging cycle ($T_{start}$) and the end of the charging cycle ($T_{end}$). The charging cycle in the data plan (T) may include specific dates or a range during which charging occurred. The PoC may be cryptographically secured, and as such, the third-party verifier may have public keys for the vendor and the operator. Accordingly, the verifier may further be provided the decryption keys, such as vendor public key ($K_e^+$) and operator public key ($K_o^+$). Finally, the verifier may be provided the predefined charging weight (c), as explained above.

After receiving the PoC and associated information, the verifier may decrypt the PoC using the vendor and operator public keys ($K_e^+$, $K_o^+$), illustrated in line 1. After decryption, the verifier checks if the data plan (T) and the agreement between the vendor and the operator, including the predefined charging weight (c), is consistent, illustrated at line 2. If there are inconsistencies between the vendor and operator agreement, the verifier stops verification at line 3. If the vendor and operator agreement is consistent, the verifier continues to defend against replay attacks i.e., replay the outdated PoC to pass the verification by checking if the decrypted nonces from the vendor and operator ($n_e$, $n_o$) and the sequence numbers from the vendor and operator ($s_e$, $s_o$) are the same as the plain-text ones in the PoC, illustrated at line 5. If they are not, then verification ends.

If the nonces and sequence numbers are the same as the plain text nonces and sequence numbers the verifier proceeds to check the data charging records, including the received data volume ($X_o$) provided by the operator and the sent data volume ($X_e$) provided by the vendor, as well as the negotiated data volume X, illustrated at line 8. The third-party verifier may replay the process discussed above with respect to FIG. 3B to determine whether the received data volume ($X_o$), the sent data volume ($X_e$), and the negotiated data volume X are consistent. If they are consistent, the third-party verifier may indicate that the negotiation was successful and the data charging between operator and vendor is verified, illustrated at line 9 as returning X'=X.

If the negotiation is not verified, the third-party verifier may inform the operator and vendor, as well as other third parties such as enforcement organizations. Operator and vendor may renegotiate the charging or otherwise take further actions to remediate the issue. In certain implementations, enforcement organizations may levy fines or take other actions on one or more of the operator and/or vendor 505. In other implementations, the information may be publicly available, thereby serving as a deterrent against unscrupulous operators and/or vendors.

Figure 6:
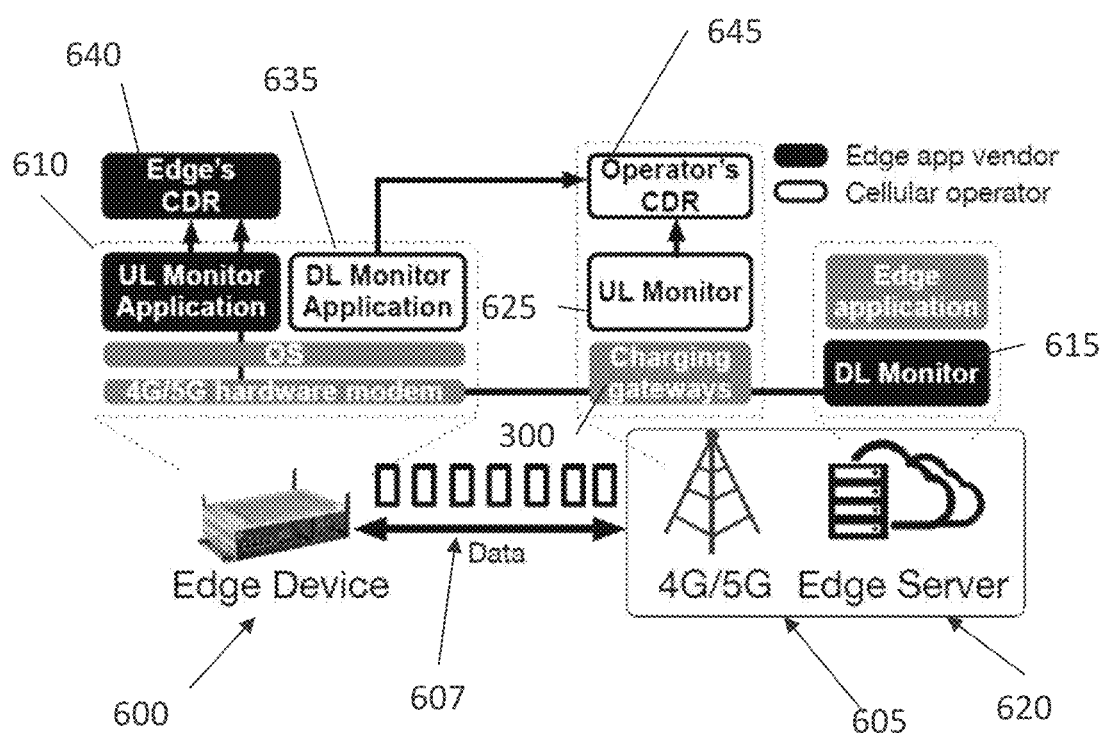
FIG. 6 is a representation of a network that includes monitoring for uplink and downlink traffic, according to one or more examples of the disclosure.

Turning to FIG. 6, a representation of a network that includes monitoring for uplink and downlink traffic, according to one or more examples of the disclosure is shown. In operation, as described above, vendors provide sent data volumes and operators provide received data volumes to one another. To determine sent and received data volumes, vendors and operators may collect data usages at various points within the network. In this implementation, a vendor 600 is represented as an edge device, which is using a wireless network provided by an operator 605. The operator 605 may be operatively connected to a server 620. Thus, in operation, data 607 may be transmitted from a device of a vendor 600 over the operator 605 network and downloaded onto server 620. Data may also be sent by operator 605 over the network to the device of the vendor 600.

Vendor 600 may determine the sent data volume by using a vendor uplink monitor application 610. Vendor uplink monitor application 610 may include hardware and/or software that counts the traffic inside its device-side applications. Vendor uplink monitor application 610 may further count bytes transmitted, as well as network packets transmitted, over various types of mobile interfaces. Vendor 600 may further determine the sent data volume using a vendor downlink monitor 615. Vendor downlink monitor 615 may be employed inside a server 620, such as an edge server. Vendor downlink monitor 615 may include hardware and software that counts bytes of information downloaded from specific vendor 600 devices onto server 620.

Operator 605 may determine the received data volume using an operator uplink monitor 625. Operator uplink monitor 625 may include hardware and software that collects data from the charging function, described with respect to FIG. 1, and one or more charging gateways 630. In certain implementations, charging gateways 630 and charging functions may have previously collected the received data volume, and as such, the previously collected data may be reused by operator uplink monitor 625. Operator 605 may further include an operator downlink monitor 635. Operator downlink monitor 635 may include hardware and software that is located on or operatively connected to vendor 600 devices. In certain implementations, where operator downlink monitor 635 is implemented in vendor 600 device hardware, the operator downlink monitor 635 may be resilient to manipulation by vendor 600. Vendor uplink monitor application 610 may generate a vendor CDR 640, while the operator uplink monitor 625 may generate an operator CDR 645. The CDRs 640 and 645 may be exchanged, as discussed above, during charging negotiations. To further explain operator downlink monitor 635, a detailed discussion is provided below in FIG. 7.

Figure 7:
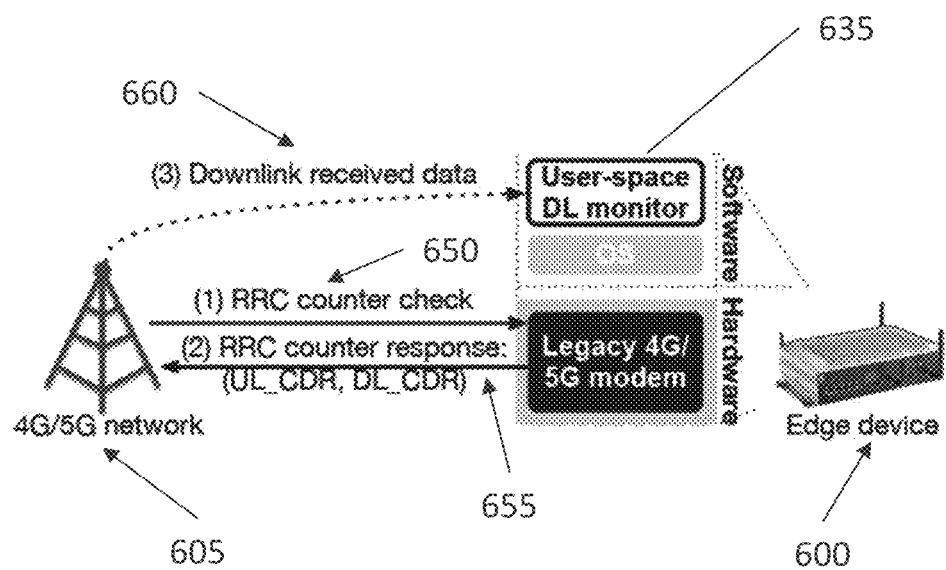
FIG. 7 is a representation of a network that includes operator downlink monitor deployed in vendor device, according to one or more examples of the disclosure.

Turning to FIG. 7, a representation of a network that includes operator downlink monitor 635 deployed in vendor 600 device, according to one or more examples of the disclosure is shown. Operator downlink monitor 635 may be installed on vendor 600 device as a software application that has access to modem 660 hardware.

To send/receive data from operator 605 to vendor 600 devices, operator 605 may establish a radio connection with vendor 600 devices. Operator 605 may send a secure counter check, such as a radio resource control ("RCC") counter check 650 to the vendor 600 device and query the device for received traffic through the connection. The modem may reply with a data volume usage in an RCC counter response 655 message. In operation, as data is received 660 by vendor 600 devices. Before vendor 600 devices stops data transfer between the device and operator 605 and disconnects from operator 605, operator 605 initiates the RCC counter check. Operator downlink monitor 635 then sends the data volume usage to operator 605 before the connection is closed. Operator 605 may then take all data volume usage from each vendor 600 device and add the data volume usage to determine the received data volume. The received data volume may subsequently be used in the calculations described in detail above.

Figure 8:
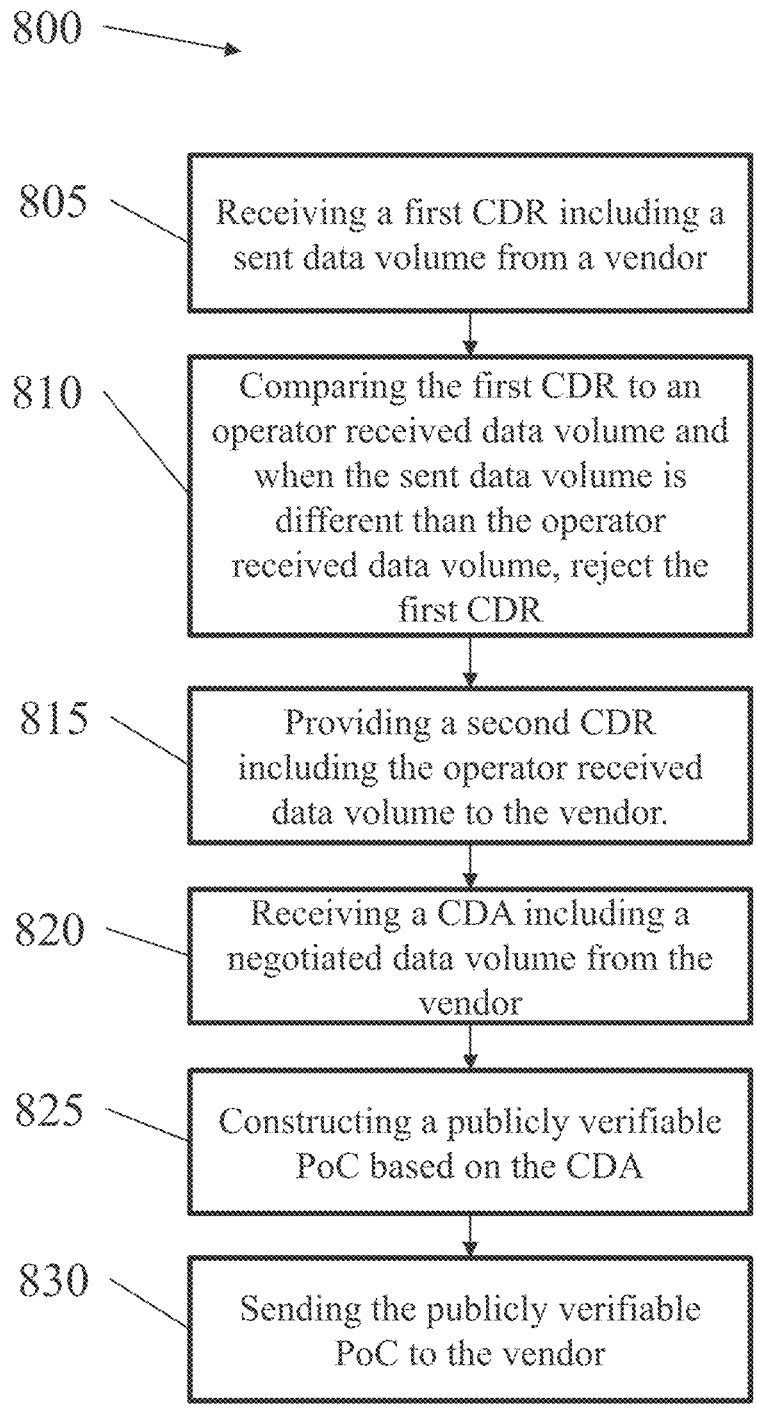
FIG. 8 is a flowchart depicting a method for client validation, according to one or more examples of the disclosure.

Turning to FIG. 8, a flowchart depicting a computer implemented method for decreasing latency in a charging cycle, according to one or more examples of the disclosure is shown. In operation, method 800 includes receiving (block 805) a first CDR including a sent data volume from a vendor. The sent data volume may include volume that the vendor has determined or calculated to have been sent from one or more vendor devices, such as edge devices, over an operator's network. For example, the operator may provide cellular network services such as 4G, 4G LTE, 5G, and the like. Devices may send data over the cellular network to be received by one or more servers, such as edge servers. The servers may use the data to perform computations, and in certain implementations, the servers may provide data back to devices over the cellular network. Thus, data is sent between one or more vendor devices to one or more vendor or operator servers over the cellular network.

The sent data volume in the first CDR may represent all or a portion of sent data volume for vendor's devices for a select period of time. For example, the vendor may send all data volume that is used by all devices during a charging/billing cycle. In other examples, the vendor may send data volume that is used by a single device or a subset of devices during a billing cycle.

Method 800 further includes comparing (block 810) the first CDR to an operator received data volume and when the sent data volume is different than the operator received data volume, rejecting the first CDR. The operator received data volume may include all of the data received over the operator's network during the charging/billing cycle. For example, multiple vendor devices may operate over the operator's network. The operator may pool all of the data from all of the devices for the vendor during the billing cycle and compare the sum of the data to the sent data volume received from the vendor.

In this implementation, the sent data volume from the vendor is different than the operator received data volume. This may occur for a number of reasons, such as those discussed in detail above. For example, data loss may occur over a network as a result of moving devices, intermittent service, and the like. The data loss may thus result in a vendor reporting lower volumes of sent data and the operator reporting relatively higher volumes of received data. The difference between the sent data volume and the received data volume may also be the result of selfish activities by one or more of the vendor and the provider. For example, the operator may be overcharging to gain increased revenue, while the vendor may be undercharging to decrease the cost of network service. Whether the difference between the sent data volume and the received data volume is due to data loss or selfish actions of one or more of the parties, when the first CDR does not match the operator received data volume, the operator may reject the first CDR.

Method 800 further includes providing (block 815) a second CDR including the operator received data volume to the vendor. The second CDR may include both the sent data volume, as provided by the vendor, and the operator received data volume. Thus, the vendor may compare the differences between the sent data volume and the operator received data volume.

Method 800 further includes receiving (block 820) a CDA including a negotiated data volume from the vendor. When the vendor sends a CDA with the negotiated data volume, the vendor is indicating that the proposal of the operator in the second CDR was acceptable. In addition to the negotiated data volume, the CDA may further include the sent data volume and the operator received data volume, as provided in the second CDR. As such, a record of the transaction may be maintained.

Method 800 further includes constructing (block 825) a publicly verifiable PoC based on the CDA. When the publicly verifiable PoC is constructed, the operator, in this example, has agreed to the negotiated data volume provided by the vendor in the CDA. The publicly verifiable PoC may include the negotiated data volume, which is representative of a sent data volume that matches or is otherwise equal to the operators received data volume. The publicly verifiable PoC may further include one or more of a revised sent data volume, an operator received data volume, a revised operator received data volume, or a combination of sent and/or received data volumes, where the sent and received data volumes match the negotiated data volume.

Method 800 further includes sending (block 830) the publicly verifiable PoC to the vendor. As such, both parties have a copy of the publicly verifiable PoC. The publicly verifiable PoC may also be saved as a charging receipt by one or more of the vendor and the operator, thereby provided a digitally signed document representative of the agreement between the vendor and the operator. The publicly verifiable PoC may also be sent to a verifier. The verifier may determine whether the negotiated data volume is the same as the operator received data volume. In such a process, the verifier may include one or more of the independent third-party verifiers discussed above. The verifier may thus rerun the negotiation between the vendor and operator to determine whether one or more parties were acting maliciously. If malicious activity is observed by the verifier, the verifier may enforce penalties on the malicious party or may otherwise make the information public.

In certain negotiations, the process of receiving and providing CDRs may result in a negotiation that is over in a single round. In such a situation, if the vendor and the operator both report actual sent data volumes and actual received data volumes, then the data volumes will match, and the negotiated data volume will be representative of the actual data volumes. In another situation, if after the first round of negotiations, the sent data volumes match the actual received data volumes, and the received data volumes match the actual send data volumes, both data volumes match.

In certain implementations, more than one round of negotiations may occur, thereby resulting the three, four, five, or more CDRs and/or CDAs. However, this is generally not beneficial to either party. With respect to the operator, the operator will not receive payment until the negotiations are resolved. With respect to the vendor, the vendor will not receive service from the operator before the charging/billing cycle is complete. Thus, it is in the best interests of both parties to resolve the negotiation as quickly as possible. As a result of the faster negotiations, decreased network latency may also be achieved.

Figure 9:
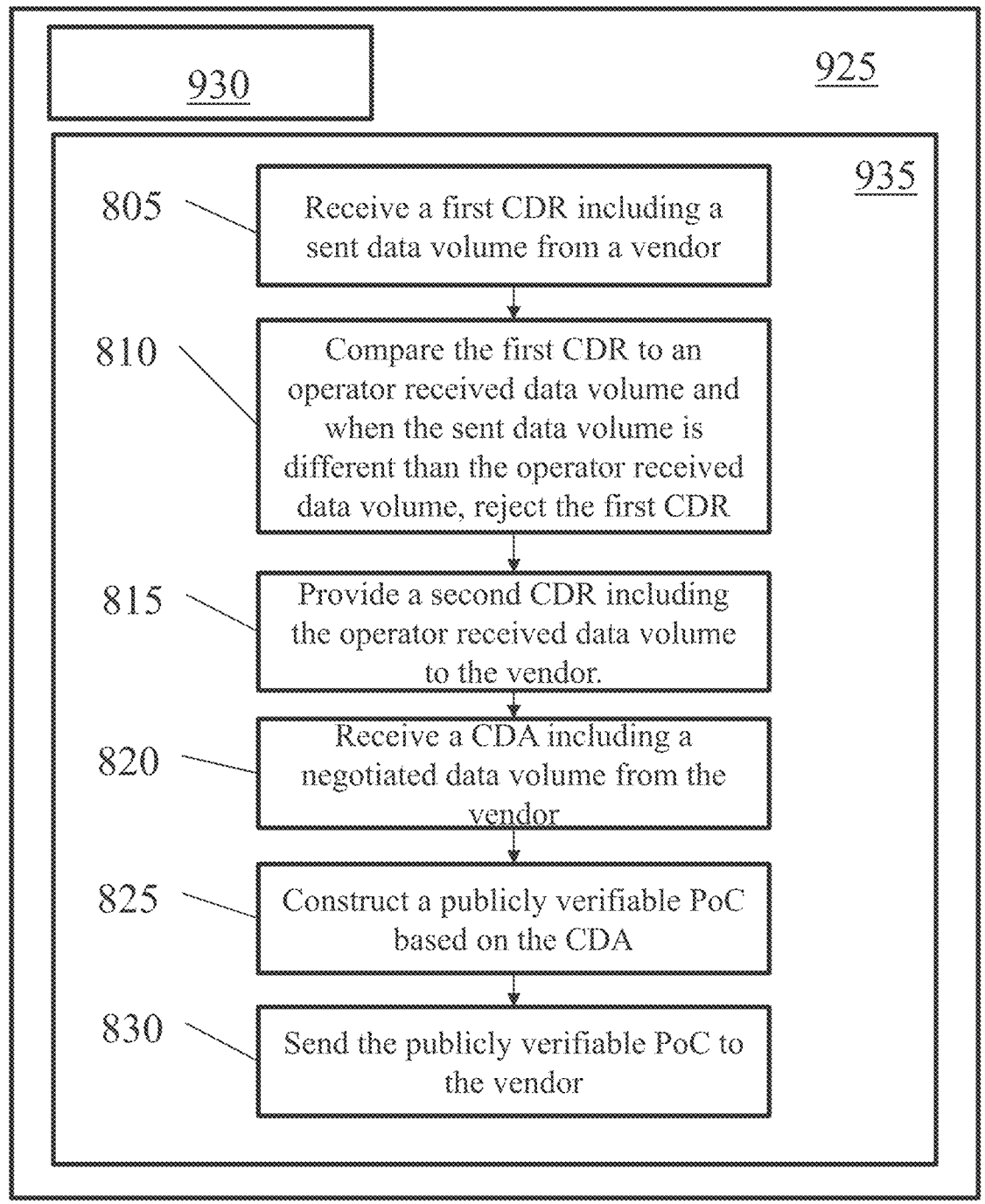
FIG. 9 is an example computing device with a hardware processor and accessible machine-readable instructions, according to one or more examples of the disclosure.

Turning to FIG. 9, an example computing device with a hardware processor and accessible machine-readable instructions, according to one or more examples is shown. FIG. provides an example computing device 925, with a hardware processor 930, and accessible machine-readable instructions stored on a machine-readable medium 935 for validating end users with respect to one or more disclosed example implementations. FIG. 9 illustrates computing device 925 configured to perform the flow described in blocks 805, 810, 815, 820, 825, and 830, discussed in detail with respect to FIG. 8. However, computing device 925 may also be configured to perform the flow of other methods, techniques, functions, or processes described in this disclosure.

A machine-readable storage medium, such as 965 of FIG. 9, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 10:
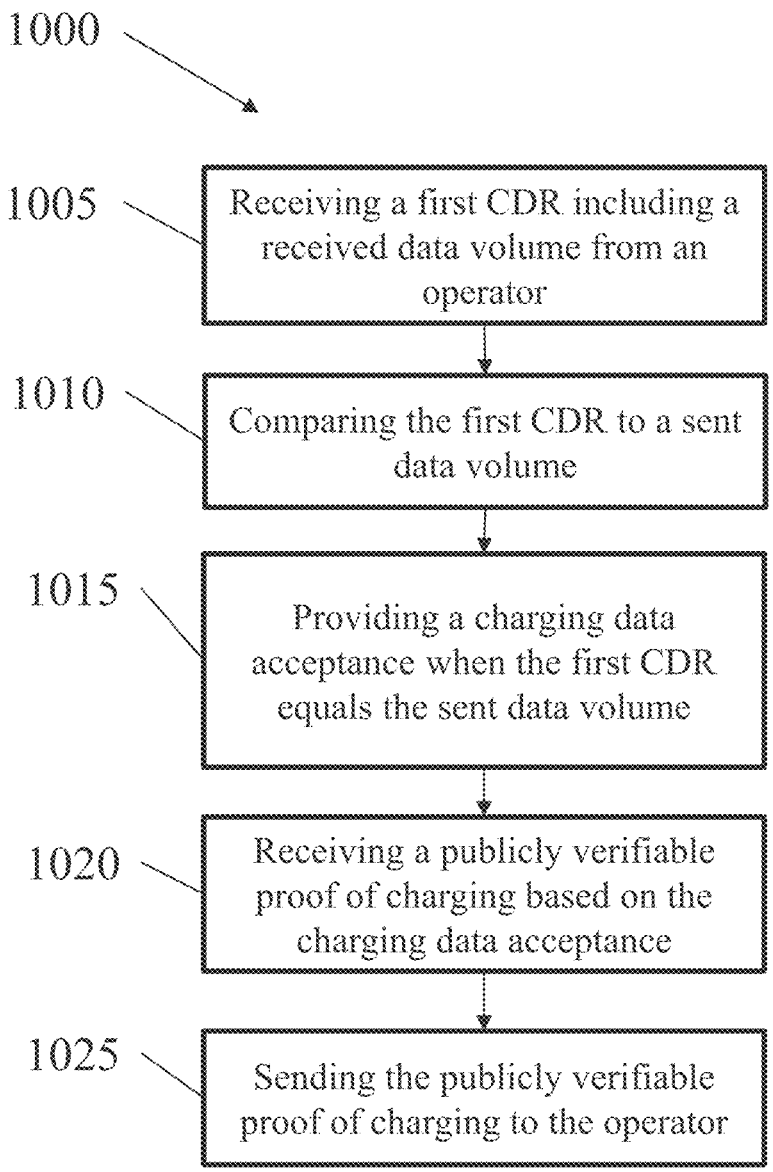
FIG. 10 is a flowchart depicting a method for client validation, according to one or more examples of the disclosure.

Turning to FIG. 10, a flowchart depicting a computer implemented method for decreasing latency in a charging cycle, according to one or more examples of the disclosure is shown. Method 1000 includes receiving (block 1005) a CDR including a received data volume from an operator. As discussed above, the first CDR may provide the vendor with a first option to review the received data volume that is claimed by the operator.

Method 1000 further includes comparing (block 1010) the first CDR to a sent data volume. During the comparison, the vendor may review the received data volume and determine whether the received data volume is the same as the sent data volume. As previously discussed, if the received data volume is the actual received data volume and the sent data volume is the actual send data volume, then the two data volumes will match, and no further negotiation is required. In the present example, the first CDR includes a received data volume that matches the sent data volume.

Method 1000 further includes providing (block 1015) a CDA when the first CDR equals the sent data volume. In this instance, because the first CDR was determined to equal the sent data volume during the comparison, no further negotiation is required, and rather than send a revised CDR to the operator, the vendor may send the CDA.

Method 1000 further includes receiving (block 1020) a publicly verifiable proof of charging based on the charging data acceptance. After the vendor provides the CDA to the operator and the operator accepts the CDA, the vendor sends the publicly verifiable PoC based on the charging CDA to the vendor. The vendor may then execute the publicly verifiable PoC.

Method 1000 further includes sending (block 1025) the publicly verifiable PoC to the operator. After the vendor executes the publicly verifiable PoC, the vendor may return the publicly verifiable PoC to the vendor, and as such, both parties have an executed agreement as to the billing terms for the charging cycle.

Figure 11:
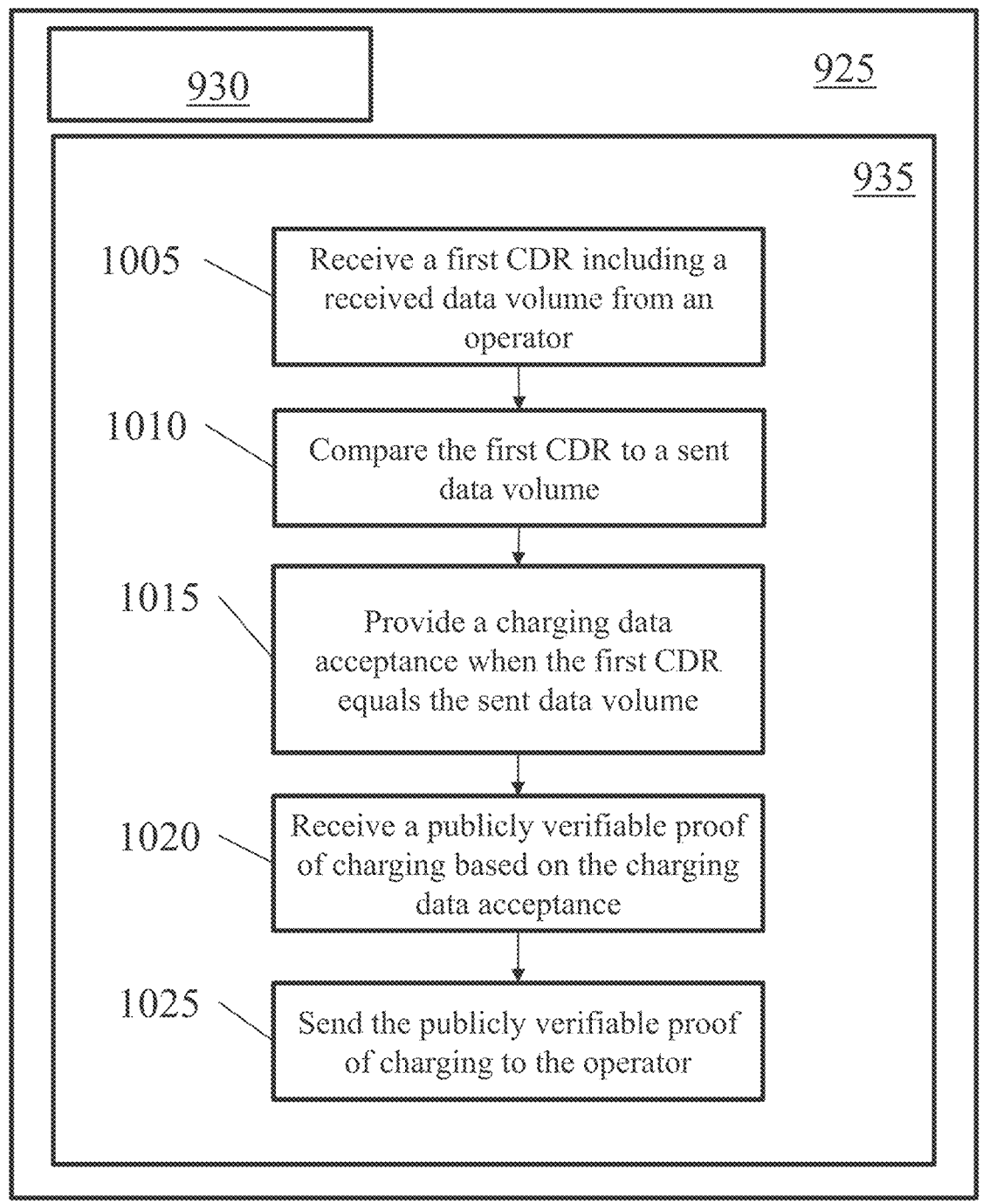
FIG. 11 is an example computing device with a hardware processor and accessible machine-readable instructions, according to one or more examples of the disclosure.

Turning to FIG. 11, an example computing device with a hardware processor and accessible machine-readable instructions, according to one or more examples is shown. FIG. 11 provides an example computing device 925, with a hardware processor 930, and accessible machine-readable instructions stored on a machine-readable medium 935 for validating end users with respect to one or more disclosed example implementations. FIG. 11 illustrates computing device 925 configured to perform the flow described in blocks 1005, 1010, 1015, 1020, and 1025 discussed in detail with respect to FIG. 10. However, computing device 925 may also be configured to perform the flow of other methods, techniques, functions, or processes described in this disclosure.

Figure 12:
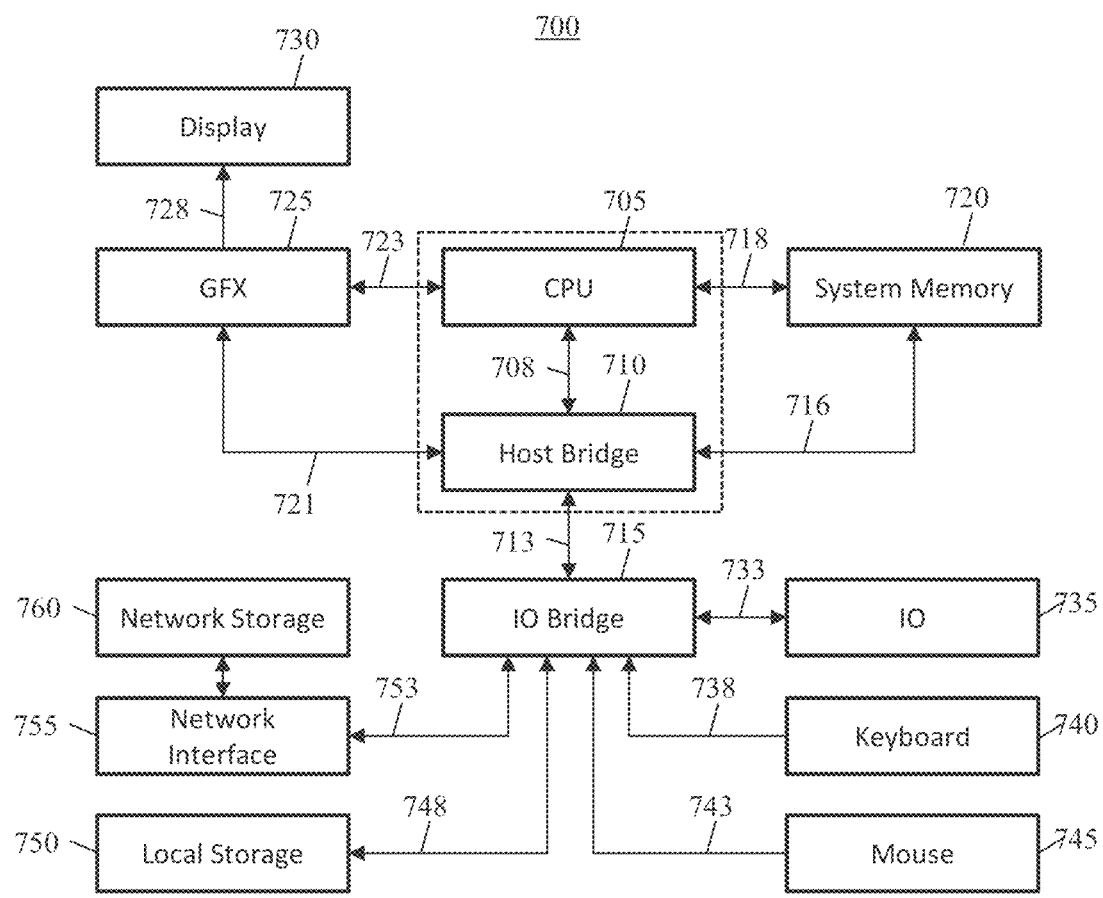
FIG. 12 is a schematic representation of a computer processing device that may be used to implement functions and processes, according to one or more examples of the present disclosure, according to one or more examples of the disclosure.

Turning to FIG. 12, a schematic representation of a computing device 700 that may be used to implement functions and processes in accordance with one or more examples of the present disclosure is shown. FIG. 12 illustrates a computing device 700 that may be used to implement the systems, methods, and processes of this disclosure. For example, computing device 700 illustrated in FIG. 12 could represent a client device or a physical server device and include either hardware or virtual processor(s) depending on the level of abstraction of the computing device. In some instances (without abstraction), computing device 700 and its elements, as shown in FIG. 12, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware.

Computing device 700 may include one or more central processing units (singular "CPU" or plural "CPUs") 705 disposed on one or more printed circuit boards (not otherwise shown). Each of the one or more CPUs 705 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computing device 700 may include one or more core logic devices such as, for example, host bridge 710 and input/output ("IO") bridge 715.

CPU 705 may include an interface 708 to host bridge 710, an interface 718 to system memory 720, and an interface 723 to one or more IO devices, such as, for example, graphics processing unit ("GFX") 725. GFX 725 may include one or more graphics processor cores (not independently shown) and an interface 728 to display 730. In certain examples, CPU 705 may integrate the functionality of GFX 725 and interface directly (not shown) with display 730. Host bridge 710 may include an interface 708 to CPU 705, an interface 713 to IO bridge 715, for examples where CPU 705 does not include interface 718 to system memory 720, an interface 716 to system memory 720, and for examples where CPU 705 does not include integrated GFX 725 or interface 723 to GFX 725, an interface 721 to GFX 725. One of ordinary skill in the art will recognize that CPU 705 and host bridge 710 may be integrated, in whole or in part, to reduce chip count, motherboard footprint, thermal design power, and power consumption. IO bridge 715 may include an interface 713 to host bridge 710, one or more interfaces 733 to one or more IO expansion devices 735, an interface 738 to keyboard 740, an interface 743 to mouse 745, an interface 748 to one or more local storage devices 750, and an interface 753 to one or more network interface devices 755.

Each local storage device 750 may be a solid-state memory device, a solid-state memory device array, a hard disk drive, a hard disk drive array, or any other non-transitory computer readable medium. Each network interface device 755 may provide one or more network interfaces including, for example, Ethernet, Fibre Channel, WiMAX, Wi-Fi®, Bluetooth®, or any other network protocol suitable to facilitate networked communications. Computing device 700 may include one or more network-attached storage devices 760 in addition to, or instead of, one or more local storage devices 750. Network-attached storage device 760 may be a solid-state memory device, a solid-state memory device array, a hard disk drive, a hard disk drive array, or any other non-transitory computer readable medium. Network-attached storage device 760 may or may not be collocated with computing device 700 and may be accessible to computing device 700 via one or more network interfaces provided by one or more network interface devices 755.

One of ordinary skill in the art will recognize that computing device 700 may include one or more application specific integrated circuits ("ASICs") that are configured to perform a certain function, such as, for example, hashing (not shown), in a more efficient manner. The one or more ASICs may interface directly with an interface of CPU 705, host bridge 760, or IO bridge 715. Alternatively, an application-specific computing system (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 705, host bridge 710, IO bridge 715, or ASICs or various sub-sets, super-sets, or combinations of functions or features thereof, may be integrated, in whole or in part, or distributed among various devices in a way that may vary based on an application, design, or form factor in accordance with one or more example examples. As such, the description of computing device 700 is merely an example and not intended to limit the type, kind, or configuration of components that constitute a computing system suitable for performing computing operations, including, but not limited to, hashing functions. Additionally, one of ordinary skill in the art will recognize that computing device 700, an application specific computing system (not shown), or combination thereof, may be disposed in a standalone, desktop, server, or rack mountable form factor.

One of ordinary skill in the art will recognize that computing device 700 may be a cloud-based server, a server, a workstation, a desktop, a laptop, a netbook, a tablet, a smartphone, a mobile device, and/or any other type of computing system in accordance with one or more example examples.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A non-transitory computer readable medium comprising computer executable instructions stored thereon that, when executed by a processor in a source system, cause the processor to:
receive, at a downlink monitor, a sent data volume from an external computing device of a vendor by sending a secure counter check to the external computing device;
determine, by an uplink monitor, an operator received data volume from the vendor based on a charging function;
receive a first charging data report (CDR) including the sent data volume from a vendor;
compare the first CDR to an operator received data volume and when the first CDR is different than the operator received data volume, rejecting the first charging report;
provide a second CDR having the operator received data volume to the vendor;
receive a charging data acceptance including a negotiated data volume from the vendor derived from calculating a constraint-bound charge range between the sent data volume and the operator received data volume based on a representation of the sent data volume relative to the received data volume allowing reconciliation of the difference therebetween;
construct a publicly verifiable proof of charging based on the charging data acceptance; and
send the publicly verifiable proof of charging to the vendor.

2. The non-transitory machine readable storage medium of claim 1, further comprising instructions to:
reject the charging data acceptance from the vendor and providing a third CDR including a revised operator received data volume to the vendor.

3. The non-transitory machine readable storage medium of claim 1, further comprising instructions to:
send a second charging data acceptance to the vendor when the third CDR charging report matches the operator received data volume.

4. The non-transitory machine readable storage medium of claim 1, further comprising instructions to:
save the publicly verifiable proof of charging as a charging receipt, wherein the charging receipt is signed by the vendor and the operator.

5. The non-transitory machine readable storage medium of claim 1, further comprising instructions to:
send the publicly verifiable proof of charging to a public verifier, the public verifier to determine whether the negotiated data volume is the same as the revised received data volume.

6. The non-transitory machine readable storage medium of claim 1, wherein the second CDR includes a charging weight for lost data.

7. The non-transitory machine readable storage medium of claim 1, receiving a third CDR including a revised sent data volume from the vendor.

8. The non-transitory machine readable storage medium of claim 1, wherein the second charging report comprises the constraint to bound the charge range between the sent data and the operator received data.

9. The non-transitory machine readable storage medium of claim 1, wherein the negotiated data volume is the same as at least one of the sent data volume and the operator received data volume.

10. The non-transitory machine readable storage medium of claim 1, wherein the negotiated data volume is greater than or equal to the operator received data volume and less than or equal to the sent data volume.

11. The non-transitory machine readable storage medium of claim 1, wherein the first CDR is rejected when the sent data volume is less than the operator received data volume.

12. The non-transitory machine readable storage medium of claim 1, wherein the negotiated data volume comprises:
a data volume that is equal to an actual received data volume by the operator added to a data loss.

13. The non-transitory machine readable storage medium of claim 12, wherein the data loss is multiplied by a charging weight.

14. The non-transitory machine readable storage medium of claim 1, wherein the publicly verifiable proof of charging comprises:
a charging cycle for a data plan;
a vendor decryption key;
an operator decryption key; and
a charging weight.

* * * * *